June 23, 1936. W. J. PODBIELNIAK 2,044,996
METHOD OF SECURING COUNTER CURRENT CONTACT OF FLUIDS BY CENTRIFUGAL ACTION
Original Filed Aug. 18, 1930 2 Sheets-Sheet 2

Inventor
Walter J. Podbielniak
by
[signature]
Attorney

Patented June 23, 1936

2,044,996

UNITED STATES PATENT OFFICE 2,044,996

METHOD OF SECURING COUNTER CURRENT CONTACT OF FLUIDS BY CENTRIFUGAL ACTION

Walter J. Podbielniak, Chicago, Ill., assignor to Lois W. G. Podbielniak, Tulsa, Okla.

Original application August 18, 1930, Serial No. 476,190. Divided and this application May 1, 1935, Serial No. 19,327. In Canada August 12, 1931

19 Claims. (Cl. 261—83)

This invention deals with the art of securing counter current flow or contact and interchange between fluids by application of centrifugal force and may be utilized for purposes of distillation and fractionation, absorption, or contacting of partly or wholly immiscible liquids, although not limited to such processes. In order that the invention may be fully understood, it is exemplified herein in connection with a process for the fractional distillation of fluids having constituents of different boiling points. The invention is not limited to such processes, nor the details thereof as set forth herein. This application is divided from my prior application Serial No. 476,190 filed August 18, 1930.

In order that the objects and accomplishments of the invention may be most fully and clearly understood in connection with the securing of effective counter current contact between fluids, I shall discuss preliminarily some of the problems and difficulties commonly met with in attempting to accomplish precise or close fractionation, a process in which such contact is required to a high degree; and I shall also mention briefly the short-comings of the usual type of fractionating apparatus which render such apparatus incapable of effecting close fractionation in the distillation of fluids or mixtures having the characteristics hereinafter mentioned. In the commercial or laboratory distillation of liquid mixtures having constituents or fractions of various boiling points, it is frequently desirable, and in many cases essential, to be able to fractionate the mixture with such closeness as to isolate the constituents in substantially their pure state. For example, in the distillation of crude petroleum or other mixtures of similar complexity of composition, it is desirable for numerous reasons to be able to fractionate the crude into constituents ranging in volatility from the lightest to the heaviest, with such closeness or sharpness of separation that the fractions or cuts will consist of the constituents of the mixture in substantially pure conditions, or of compounds which together have a very close boiling range. An extremely difficult problem in counter current contact is thereby presented.

In certain of the more efficient types of common fractionating apparatus, fairly close fractionation of the more volatile constituents of a mixture may be brought about. For instance, the highly volatile constituents of natural gas ranging say from methane through the pentane fractions, may be isolated in a fairly pure state by the use of highly efficient and properly designed fractionating columns, particularly in small scale laboratory equipment. However, when it is attempted to separate the fractions or constituents of comparatively higher boiling point and higher molecular weight, whether in petroleum or other complex mixtures, heretofore insurmountable difficulties have been encountered such as prevent precise fractionation and isolation of the higher boiling point constituents, due chiefly to the increasing complexity of isomeric compounds for any given boiling range, and because of the extreme closeness in boiling point of many of these heavier constituents. In order to approximate close fractionation of such mixtures by the usual types of fractionating apparatus, extremely high or long fractionating columns are required. However, even these fail to accomplish the separation of the heavier fractions with the desired closeness when such fractions reach the higher boiling ranges and complexity of molecular structure. Insofar as I am aware, the separation of the heavier fractions having boiling points within a range of about 6° C., cannot be accomplished by fractionating equipment heretofore employed, whether in laboratory or commercial scale distillation. It may be stated that from an analytical standpoint, it is desirable to determine the exact composition of petroleums and other similar complex mixtures, and to be able to carry the analysis of the mixture through the heaviest constituents which it may contain.

By the method of the present invention, I am enabled to secure a fractional distillation by which volatile mixtures may be separated into their pure constituents, or single compounds, or into fractions having an extremely close boiling point range which may be as low as 1° C. or less. The invention provides further a method of securing the effectiveness of counter current contact necessary to accomplishing such close fractionation without the requirement for large and complicated equipment.

In order to secure the contact conditions necessary to attain precise fractionation of the heavier and more complex fractions of petroleum crudes, for example, by ordinary methods, there would be required a fractionating column of unreasonably and impractically great length or height. The reason for this will be readily understood by those familiar with the art, since the commonly accepted theory of fractional distillation involves the idea that the degree of closeness with which any two fractions may be separated depends upon the intimacy and time of contact between the liquid and gaseous phases. An ideal column which would accomplish perfect separation between the constituents of a mixture would be one of infinite length, of infinitesimal diameter, and which holds at any one time an infinitesimal quantity of liquid and vapor. Although the theoretical requirement of infinitesimal liquid or vapor holdup is of primary importance in batch distillation, in any case minimum liquid and vapor holdup is a practical advantage in decreasing the size of the equipment and amount of desirable constituent held up.

Aside from practical considerations of difficulty, inconvenience, and expense involved in constructing fractionating columns of length substantially greater than those now in use, such construction is made impossible due to the fact that in the usual fractionating column, gravity is relied upon to cause the liquid or reflux to flow downward and counter-currently to the ascending vapor within the column. Hence, the usual fractionating column must, of course, be built vertical and designed and given such dimensions that the vapor will not hold up the liquid flow or cause the liquid to be entrained or carried by the vapor stream. It necessarily follows then that the vapor velocity must be held within certain comparatively low limits by building the columns with correspondingly large diameters, in order that the vapor velocity will not become so high that the reflux liquid is carried with the vapors, thereby resulting in priming or flooding of the column. I may also state that sufficient clearance or spacing between the plates of the column must be allowed in order to avoid priming, and in many cases the factor of clearance alone may necessitate building a fractionating column of very great length.

Because heretofore gravity has been resorted to as a means for bringing about counter current flow and contact of the reflux liquid with the vapor, a limit has been reached as to the efficiency which such apparatus may have, in that although the advantages of building columns of much greater lengths has been well appreciated, the impracticability from engineering and economical standpoints has prevented such constructions. Accordingly the efficiency of the apparatus has been limited by the practical considerations involved.

The present invention departs from the usual methods for securing counter current contact, as in fractional distillation, in the utilization and adapting of a different force in bringing about counter-current flow and contact of the vapors and the reflux liquid. Instead of causing the reflux to flow by gravity, I bring about counter-current flow of the reflux by centrifugal force, taking advantage of the difference in specific gravity of the fluids involved, which are the reflux and the vapor. By the aid of centrifugal force, the reflux may be caused to flow at a high rate through a fractionating column or tube of small diameter or clearance, thereby reducing the amount of liquid and vapor held in the column to a minimum, and without interference with the flow of the reflux by the vapors, since by virtue of the differences in specific gravities of the two fluids, they are caused to follow separate and non-interfering paths. Also the centrifugal force may be made to overcome very much greater "interferences" or pressure drops which normally would occur, than would be possible with gravity alone. By so employing centrifugal force, the fractionating column or tube may be built or mounted in the form of a rotatable channel or passageway such as a coil, enabling the entire column to be built in an extremely compact form, and to be of practically any desired length without involving prohibitive constructions. A close approach to the ideal column characterized hereinabove is therefore made possible by the invention in that the column may be made of great length and capable of great capacities since the reflux and vapor may be put through the column at high rates regardless of the column diameter, to the end that a far greater efficiency is attained in bringing about close contact and fractionation than can possibly be attained by equipment heretofore used.

It is to be distinctly understood that the invention broadly contemplates the use of centrifugal force in effecting intimate and extended contact of a liquid with a gas or vapor or one fluid with another, in a variety of situations in which the object of the operation is to bring about contact between the relatively lighter and relatively heavier fluids. For example, instead of subjecting a liquid and gas or vapor to this action for the purpose of fractionating the constituents thereof, the present method may be employed for effecting vaporization of fairly volatile constituents of the liquid, or for loading the liquid with or causing to be absorbed therein, certain constituents in or carried by the vapors. This latter procedure will be readily recognized as that followed in absorption systems wherein an absorbing liquid, by virtue of extended and intimate contact with a vapor or gas, is caused to hold or absorb certain desirable constitutents of the gas which are subsequently recovered by separation from the absorbing liquid. It is obvious also that the centrifugal force will remove from the vapors or other relatively lighter fluid, entrained particles heavier or denser than the fluid from which it is desired to free them by throwing such particles into the liquid.

For purposes of describing the invention, I show herein a type of construction which is adapted to operate in accordance with my improved method. However, it will be understood that the invention in its broader aspects is in no way to be regarded as limited to the method of operation or the particular construction shown herein since, as I have stated, the hereinafter described form of the invention is but typical of a variety of constructions that may be used in practising the invention.

The apparatus herein disclosed for practising the invention comprises a contacting or fractionating tube in spirally coiled form carried on a rotatable body or support. Vapors are fed to the tube and reflux is returned to the tube through stationary inlet and outlet lines. Fluid tight stuffing boxes or joints are provided between the rotatable contacting tube and the stationary inlet and outlet, and although in the broader aspects of the invention any suitable type of fluid tight connection may be provided between the column and the inlet and outlet, I prefer, for reasons that will be made apparent hereinafter, to employ liquid seal joints in which liquid such as mercury is used as the sealing medium. The connections between the tube and the vapor supply source, and the outlet and reflux condenser are such as to permit heavier fractions not vaporized in the tube to be returned through the inlet to the vapor supply source or still, and the condensate from the reflux condenser to be returned through the outlet to the fractionating tube.

The above mentioned objects and aspects of the invention, as well as the various features of the form in which it is illustrated herein, will be understood from the following detailed description, reference being had throughout the description to the accompanying drawings, in which:

Fig. 3 is a reduced sectional view on line 3—3 of Fig. 2.

Figure 1:
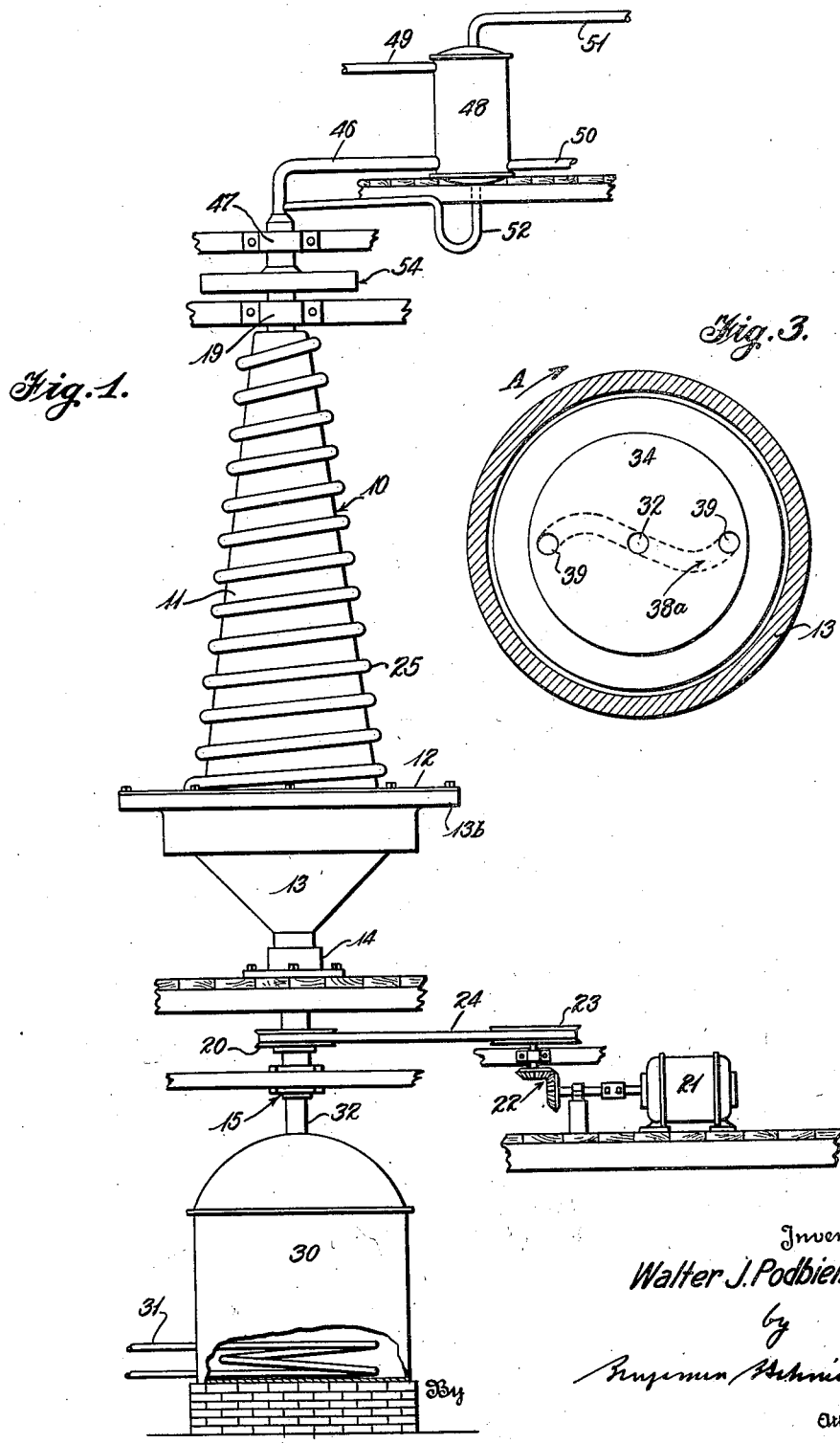
Fig. 1 is a general view, diagrammatic in parts, illustrating a suitable apparatus for carrying out the invention, the showing of the insulating layer about the contacting tube coil being omitted for purposes of more clearly illustrating the arrangement and mounting of the tube.
Figure 2:
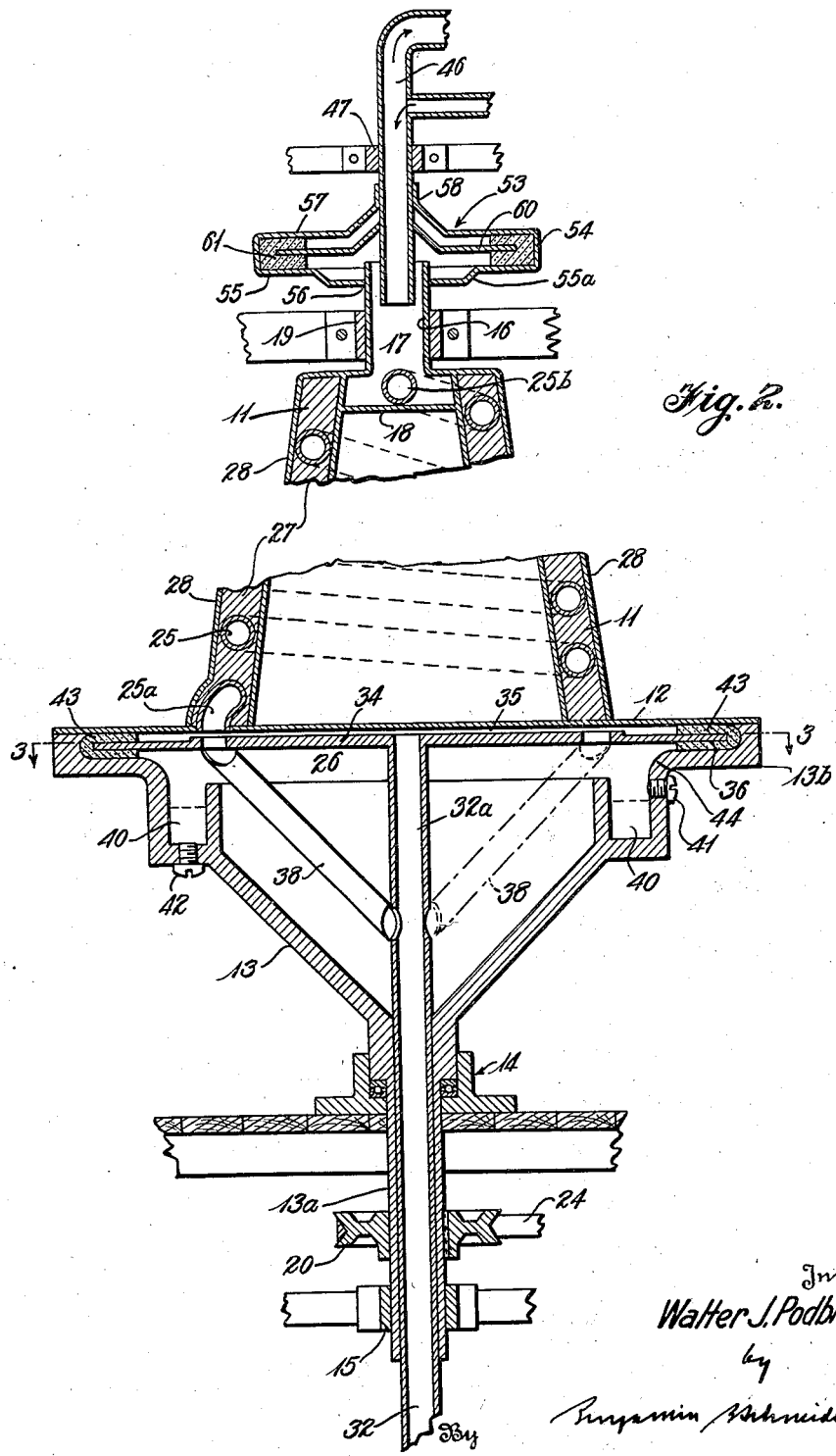
Fig. 2 is an enlarged vertically contracted sectional view taken through the fractionating apparatus.

Referring first to Figs. 1 and 2, numeral 10 denotes generally the centrifugal apparatus which comprises a rotatable mounting shell or body 11 comprising a vertical shell, which may suitably, though not necessarily, be of conical shape as indicated, and so designed that both liquid and vapor throughout the bulk of the coil length are continually forced along the desired directions through centrifugal force. It will be understood that the supporting means or body may be of various constructions and shapes and that the contacting tube or passageway, hereinafter described, may accordingly be arranged in a variety of manners. The shell 11 is supported on a circular bottom plate 12 which in turn rests on a hollow and downwardly tapering base 13 of circular section, and which may conveniently be made as a single casting. The lower reduced tubular portion 13a of the base is journaled in suitable bearings, conventionally indicated at 14 and 15, bearing 14 serving as a vertical support for the rotating parts. Shell 11 has at its upper end a tubular extension 16 which provides an inner chamber 17 closed at its lower end by plate 18. Tubular extension 16 is journaled in a suitable bearing 19. It will be apparent that various mechanical arrangements may be provided for supporting and journaling the supporting structure at its upper and lower ends, the bearing arrangement shown in the drawings being intended as typical only. The described supporting structure may be rotated by any suitable drive means, such as pulley 20 keyed to the lower tubular portion 13a of the base and driven from motor 21 by gears 22, pulleys 23 and belt 24.

Mounted on the supporting structure exteriorly of shell 11 is a spirally wound contacting tube or "column" 25, which opens at its lower end 25a through the bottom plate 12 into the interior 26 of the base 13, and at its upper end at 25b through the wall of shell 11 into chamber 17. It will be understood that although for purposes of illustration I show a contacting or fractionating tube coil having a comparatively small number of turns, the apparatus may be built so as to accommodate a coil of very great length and consisting of a correspondingly great number of turns. In order to maintain the proper temperature and equilibrium conditions in the tube, the coil may be thermally insulated with a layer 27, of suitable thermal insulating material (Fig. 2), and since during operations the coil may be revolved at a high rate of speed, the insulation may be protected by enclosing it within a suitable sheath 28. It may be stated at this point that the contacting tube diameter may be but a fraction of the diameter required for the usual fractionating column capable of corresponding throughput, because of the effect of centrifugal action in maintaining the fluids of different densities in separate paths of flow and permitting the use of greater velocities, as will more fully appear hereinafter.

Heated vapors to be subjected to rectification and fractionation in the spiral tube or column may be taken from any suitable source, such as still 30 containing the liquid mixture to be fractionated, typically a petroleum crude, the liquid being heated and evaporated in the still by means of steam coil 31. The vapors are conducted from the still 30 through line 32 which extends upwardly through the lower sleeve portion 13a of the rotatable base 13 to a point somewhat below plate 12. Pipe 32 may be regarded as a stationary vapor inlet to the fractionating apparatus. In order to prevent fluid leakage from the interior space 26 within base 13 around the inlet pipe 32 at such times as the liquid seal between the fractionating tube and pipe 32 may be ineffective, the pipe may be caused to fit more or less snugly within the elongated sleeve 13a.

Carried on the upper end of pipe 32 is a circular plate or vane 34 which is spaced at 35 a suitable distance from plate 12. The outer portion of plate 34 projects within an annular liquid seal chamber or recess 36 formed between plate 12 and the upper flanged portion 13b of the base. A suitable number of pipes or conduits 38, two being shown as typical, extend from pipe 32 at a suitable distance below its upper end, to openings 39 located in plate 34 a radial distance from the center thereof corresponding to the radial distance of the lower open end 25a of the fractionating tube. Assuming the tubular coil to be rotated in the direction indicated by arrow A in Fig. 3, tubes 38 preferably will be given at their upper ends a curvature as indicated at 38a, so that the tubes will extend substantially in line with the diagonally downward path in which the liquid discharged from the lower end of the fractionating tube will tend to follow due to the rotation of the tube.

Within base 13 and directly below flange 13b is an annular trough 40 which, when the apparatus is stationary, contains a suitable sealing fluid, preferably mercury. Filling and drain plugs 41 and 42 are provided in the side and bottom respectively of the mercury trough. As the apparatus is rotated, the mercury within trough 40 is caused by centrifugal action to rise along the outer wall of the trough, and when the apparatus is rotated at operating speed, the mercury will be displaced from the trough into the annular seal chamber 36 to the position indicated at 43. Preferably the outer wall of the trough will be curved as at 44 in order to permit smooth flow of the mercury into the sealing chamber.

The provision of a mercury seal joint of the character shown between the stationary inlet pipe 32 and the rotating fractionating tube is of particular advantage in that the parts of the seal are entirely free from wear, as distinguished from the usual type of stuffing box within which a compressed packing is used. Also, due to the great centrifugal force holding the mercury in the liquid seal chamber, the mercury will not become displaced to one side of the sealing vane 34 to such an extent as to permit passage of other fluids through the sealing liquid, even by extremely high differential pressure at opposite sides of the vane.

The vapors passing out of the upper end of the fractionating tube into the chamber 17 are conducted through a stationary outlet line 46, supported by bracket 47, to the reflux condenser 48, wherein the heavier fractions of the vapors may be condensed by a suitable cooling fluid introduced to the condenser through line 49 and discharged through line 50. The uncondensed vapors from the reflux condenser are conducted through line 51 to suitable condensing means, not shown. The reflux condensate from the condenser 48 is returned through line 52 to the vapor outlet line 46, from whence the reflux passes into chamber 17 and into the fractionating tube.

A mercury seal, generally indicated at 53 and similar in principle to the lower seal above described, is provided between the upper rotating extension 16 of the supporting structure and the stationary outlet pipe 46. The seal 53 comprises a hollow housing 54 consisting of a lower plate 55 joined at 56 to tubular portion 16, and an upper plate 57 having a reduced diameter sleeve portion 58 which may be fitted more closely to pipe 46 in order to close off the escape of any vapors that may be in the housing at such times as the mercury seal may be broken. Mounted on the outlet pipe is a circular plate or vane 59 which forms a barrier between opposite sides of the mercury seal in the same manner as the lower plate 34. The bottom 55 of housing 54 may be cupped as at 55a in order to accommodate sufficient mercury to effect the seal. Upon rotation of the housing to operating speed, the mercury rises to the position indicated at 61, thereby sealing between the spaces within the housing above and below the vane, and causing vapors from chamber 17 to pass into the outlet line.

In the operation of the apparatus, the vapors from still 30 pass upwardly through the stationary pipe 32, the major portion of the vapors flowing through the upper portion 32a of the inlet into space 35, although some of the vapors may be conducted into that space through the conduits 33. The vapors then pass into the lower end 25a of the fractionating tube 25 and upwardly through the tube into chamber 17 and the outlet line 46 leading to the reflux condenser. As previously stated, the reflux is returned through the outlet to chamber 17, from whence it flows outwardly through the fractionating tube 25 and counter-currently to the ascending vapors, into space 35. Due to its greater specific gravity, the reflux liquid in space 35 is maintained at the outside of the opening 25a and does not interfere with the flow of vapors into the fractionating tube. Liquid in space 35 passes downwardly through conduits 33 and line 32 to the evaporator.

The counter-currently flowing reflux and vapors in the contacting or fractionating tube, due to the action of the centrifugal force thereon, will be caused to flow in separate paths, the reflux, by virtue of its higher specific gravity, being caused to flow along the outside interior wall of the tube, and the vapors being forced to follow a path at the inside of the reflux. Thus the two fluids are maintained in non-interfering paths of flow with the result that a high rate of flow through the tube may be obtained without causing the previously mentioned phenomenon of priming; or in other words, without causing reflux liquid to be picked up and carried by the vapor stream. And although the liquid and vapors follow separate paths, it will be noted that the two are maintained in intimate and extended exposure since the inner surface of the liquid stream is in direct contact with the vapors, so that the centrifugal force presses the lighter fluid against the heavier one to increase their intimacy of contact, the heavier fluid being in turn pressed against the wall of the tube by the centrifugal force. A further advantageous result is brought about by the centrifugal action in that there is a tendency for the heavier constituents of the vapors to be thrown to the outward section of the vapor stream in contact with the reflux, so that the heaviest constituents of the vapors will be maintained in the most intimate contact with the reflux, the effectiveness of which in bringing about the greatest fractionating efficiency will be readily apparent to those familiar with the theories of fractionation by rectification. Any solid or liquid particles initially entrained with the vapor or other relatively lighter fluid likewise will be forced from the lighter into contact with the relatively heavier liquid by centrifugal action. Also the lightest of the liquid components will tend to be brought to the liquid-vapor interface, to obvious advantage. The most advantageous speed of rotation of the column may vary, but I may state that satisfactory results have been attained revolving the column at a rate of about 4000 R. P. M.

Since the reflux and vapors are maintained in non-interfering paths of flow, it follows that the passageway or fractionating tube may be of practically any length desired, since increasing the length of the tube will in no way act to retard the free counter-current passage of the liquid and vapor. And for similar reasons, it will be apparent that the tube or passageway may be of greatly reduced diameter or clearance, even though the velocities of the liquid and vapors passing therethrough are high, since no interference will occur which will occasion priming as the result of high velocity.

By proper control of the reflux, the composition of the vapors passing through the outlet line 51 to suitable final condensers may be controlled so that the condensate will consist, if desired, of one constituent of the mixture being evaporated, in substantially its pure state; or the condensate may consist of an extremely close-cut fraction, the boiling range of which may be as low as within 1° C. or less. The heavier liquid constituents returned from the fractionating tube to the still may be revaporized and the various fractions or constituents subsequently obtained as final condensate in the order of their decreasing volatility, as separation of the mixture constituents proceeds. The efficiency of the apparatus is such that distillation curves plotted to represent the range through which distillation is carried will indicate, in the case of separation of constituents comprising single compounds, successive condensates each of substantially constant boiling point and between which a well defined change in boiling point will appear. In the separation of constituents having a predetermined boiling range, the fractional condensates will be found to conform substantially precisely to such boiling range, without overlapping between the successive cuts.

While I have described and illustrated an apparatus particularly adapted to perform the method of my invention as applied to fractionating vapors derived from distilling complex liquids such as crude petroleum, it will be understood that I do not limit myself to such particular field of application of the process or method of my invention, which may be utilized to modify the constituents of a fluid by counter-current contact with another fluid of different density, such fluids being at least partially immiscible, and one or both of which may be a liquid, as in absorption processes, and other counter-current treatment processes.

I claim:

1. The method of modifying fluids comprising flowing fluids of different densities counter-currently in direct contact through a passageway of increasing radius while maintaining continuous communication between the source of said condenser fluid and the inlet to said passageway, rotating said passageway to develop centrifugal force and utilizing such force to force said denser fluid outwardly through the pasageway in contact with the outer wall thereof.

2. The method of modifying fluids comprising flowing fluids of different densities counter-currently in direct contact through a passageway of increasing radius, rotating said passageway to develop centrifugal force and cause the heavier fluid to move outwardly through the passageway, and forcing the lighter fluid to move inwardly through the passageway in contact with the heavier fluid.

3. The method of securing intimate contact between a liquid and a fluid of lower density which comprises supplying the liquid within a conveying channel shaped in a curve of progressively increasing radius, rotating said channel to develop centrifugal force sufficient to cause the liquid to travel outwardly through the channel and forcing the lower density fluid to pass through the channel in the reverse direction.

4. The method of securing intimate contact between a liquid and gas which comprises supplying the liquid within a conveying channel shaped in a curve of progressively increasing radius, rotating said channel to develop centrifugal force sufficient to cause the liquid to travel outwardly through the channel and forcing the gas to pass through the conduit in the reverse direction.

5. The method of separating the constituents of a gas or vapor mixture by fractional condensation which comprises forcing the mixture inwardly through a conveying channel formed in a curve of progressively increasing diameter, supplying cooling liquid in said channel, and rotating the channel to develop centrifugal force therein whereby cooling liquid and condensate formed therein are forced to travel outwardly through the channel counter-currently to the gasiform mixture.

6. The method of separating the constituents of a vaporizable liquid which comprises heating the liquid to form a vapor mixture, forcing the vapor mixture inwardly through a conveying channel formed in a curve of progressively increasing diameter, supplying cooling liquid in said conduit, and rotating the channel to develop centrifugal force therein whereby cooling liquid and condensate formed therein are forced to travel outwardly through the channel counter-currently to the gasiform mixture and discharging uncondensed vapor from the inner end of the conduit.

7. The method of fractionally separating the constituents of a gas or vapor mixture that includes causing said mixture to flow inwardly through a spiral conveying channel, supplying a cooling medium within the channel, and simultaneously rotating the channel to force condensate to flow therethrough counter-currently to the vapor mixture.

8. The method of separating the constituents of a vaporizable liquid which comprises heating the liquid to form a vapor mixture, causing the vapor mixture to flow inwardly through a spiral conveying channel, supplying a cooling medium within the conveying channel and simultaneously rotating the conveying channel to force condensate to flow therethrough counter-currently to the vapor mixture and discharging uncondensed vapor from the inner end of the conduit.

9. A method of conveying materials during treatment which comprises continuously feeding the material to a spiral conveying surface, continuously distributing the material along said spiral conveying surface by rotating said surface in such a manner as to distribute and maintain the material thereover in a film, and subjecting said distributed material, while being so conveyed, to direct contact with a treating gaseous or vaporous medium moving in a direction opposite that of the treated material, taking substantially all of the resultant vapors off at one end of the spiral and the residue of the treated material at the other end thereof.

10. In a method of treating materials capable of distribution over a surface by flow with a vapor or gaseous treating medium, said method including conveying said material during the treatment while maintaining continuous communication between the source of said material and the inlet to said surface and distributing and maintaining it in a film along a spiral path, progressively changing the properties of said material by infinitesimal steps from the initial stage of the treatment to those of the final stage of the treatment by subjecting said conveyed and distributed materials to a gas or vaporous treating medium, and causing substantially all gases and vapors to traverse said path in a counter direction to the movement of the material therein.

11. A method of treating materials including distributing and maintaining the material in a film during treatment along a closed spiral conveying channel while maintaining continuous communication between the supply of said material and the inlet of said channel by rotating such channel, gradually changing the properties of said treated material progressively by infinitesimal steps from their initial stage to their final stage of treatment by subjecting said material to a treating medium moving wholly through the channel between the points of initial and final stages of treatment and in counter direction to that of said treated material.

12. The method of bringing about intimate contact between a liquid and vapor or gas that comprises supplying the liquid to the inner end of a spiral conveying channel, rotating the spiral channel to develop such centrifugal force as to cause said liquid to travel outwardly through said channel and supplying the vapor or gas to the outer end of said channel and forcing it to pass therethrough counter-currently to the liquid.

13. The method of separating the constituents of a gasiform mixture by fractional condensation which comprises moving a cooling liquid by centrifugal force outwardly in a confined path of progressively increasing radius; and forcing the mixture inwardly in said path in contact with said cooling liquid to cause condensates from said mixture to be carried outwardly by said cooling liquid counter-currently to said gasiform mixture.

14. A method for effecting a counter-current movement between fluids having different specific gravities which comprises passing the heavier density fluid outwardly through an elongated uninterrupted confined passageway of increasing radius, passing the other fluid in a reverse direction through said passageway and rotating said passageway to develop centrifugal force sufficient to permit said fluids to flow in reverse directions in substantially continuous streams.

15. A method for effecting a counter-current movement between fluids of different densities which comprises passing the denser fluid outwardly through an elongated uninterrupted passageway of increasing radius having a restricted cross-sectional area, passing the other fluid in reverse direction through said passageway and rotating said passageway to develop centrifugal force sufficient to permit said fluids to flow in reverse directions in substantially continuous streams.

16. A method for effecting a counter-current movement between a liquid and a fluid of lower density comprising flowing the liquid outwardly through an elongated uninterrupted passageway of increasing radius, forcing the fluid of lower density in a reverse direction through said passageway and rotating said passageway to develop centrifugal force sufficient to maintain the liquid and fluid of lower density in continuous stream-like form.

17. The method of modifying fluids comprising flowing fluids of different densities continuously counter-currently in direct contact through a confined passageway of increasing radius, rotating said passageway to develop centrifugal force and utilizing such force to flow one of said fluids outwardly through the passageway in contact with the outer wall thereof.

18. The method of separating the constituents of a gasiform mixture by fractional condensation which comprises moving a cooling liquid by centrifugal force outwardly as a continuous stream in an elongated uninterrupted passageway of increasing radius having a restricted cross-sectional area; and forcing the mixture inwardly in said passageway in contact with said cooling liquid stream to cause condensates from said mixture to be carried outwardly by said cooling liquid counter-currently to said gasiform mixture.

19. The method of modifying fluids of different densities which consists in causing the fluid of greater density to move outwardly in an advancing spiral path and the fluid of lesser density to move inwardly in a contracting spiral path in contact with and in a counterflow to the fluid of greater density.

WALTER J. PODBIELNIAK.

CERTIFICATE OF CORRECTION.

Patent No. 2,044,996. June 23, 1936.

WALTER J. PODBIELNIAK.

It is hereby certified that error appears in the printed specification of the above numbered patent requiring correction as follows: Page 5, first column, line 8-9, claim 1, for the word "condenser" read denser; line 12, same claim, for "pasageway" read passageway; and second column, lines 38 to 40 inclusive, claim 11, strike out the words "while maintaining continuous communication between the supply of said material and the inlet of said channel" and insert the same after "channel" and before the comma in line 41, same claim,; and that the said Letters Patent should be read with these corrections therein that the same may conform to the record of the case in the Patent Office.

Signed and sealed this 22nd day of September, A. D. 1936.

Henry Van Arsdale (Seal) Acting Commissioner of Patents.